(12) United States Patent
Huscroft et al.

(10) Patent No.: US 10,848,380 B2
(45) Date of Patent: Nov. 24, 2020

(54) COMPUTER SYSTEM MANAGEMENTS

(71) Applicant: HEWLETT PACKARD ENTERPRISE DEVELOPMENT LP, Houston, TX (US)

(72) Inventors: Carey Huscroft, Roseville, CA (US); Dejan S. Milojicic, Palo Alto, CA (US); Stephen B. Lyle, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 103 days.

(21) Appl. No.: 15/776,919

(22) PCT Filed: Jan. 19, 2016

(86) PCT No.: PCT/US2016/013973
§ 371 (c)(1),
(2) Date: May 17, 2018

(87) PCT Pub. No.: WO2017/127057
PCT Pub. Date: Jul. 27, 2017

(65) Prior Publication Data
US 2018/0331892 A1    Nov. 15, 2018

(51) Int. Cl.
*H04L 12/24* (2006.01)
*H04L 12/28* (2006.01)
*H04L 29/08* (2006.01)

(52) U.S. Cl.
CPC ........... *H04L 41/082* (2013.01); *H04L 12/28* (2013.01); *H04L 41/00* (2013.01); *H04L 41/0806* (2013.01); *H04L 41/0886* (2013.01); *H04L 67/12* (2013.01)

(58) Field of Classification Search
CPC ...... H04L 12/28; H04L 41/00; H04L 41/0806
See application file for complete search history.

(56) References Cited

U.S. PATENT DOCUMENTS

| 7,761,530 | B2* | 7/2010 | Cain ..................... G06Q 10/06 709/213 |
| 7,975,079 | B2* | 7/2011 | Bennett ............... H04M 1/7253 361/748 |
| 8,112,771 | B2* | 2/2012 | Bernabeu-Auban ...... G06F 8/61 707/705 |
| 8,185,913 | B1 | 5/2012 | Talwar |
| 8,583,610 | B2 | 11/2013 | Allate et al. |
| 8,661,306 | B2 | 2/2014 | Zhang |
| 8,683,433 | B2* | 3/2014 | Nayak ..................... G06F 8/71 717/120 |
| 8,775,460 | B2 | 7/2014 | Auvenshine et al. |
| 9,495,238 | B2* | 11/2016 | Anderson ............... H04L 47/70 |

(Continued)

FOREIGN PATENT DOCUMENTS

| CN | 102255742 A | 11/2011 |
| WO | 2012/041683 A1 | 4/2012 |
| WO | 2015/084300 A1 | 6/2015 |

*Primary Examiner* — Ranodhi Serrao
(74) *Attorney, Agent, or Firm* — Hewlett Packard Enterprise Patent Department

(57) ABSTRACT

Examples disclosed herein relate to computer system managements. Some of the examples disclosed herein enable identifying properties of a computer system and adjusting a degree of manageability of the computer system based on the properties of the computer system.

17 Claims, 5 Drawing Sheets

(56) References Cited

U.S. PATENT DOCUMENTS

| | | | |
|---|---|---|---|
| 2005/0289228 A1* | 12/2005 | Srikanth | H04L 41/0866 |
| | | | 709/220 |
| 2008/0126439 A1 | 5/2008 | Kaminsky | |
| 2010/0235479 A1* | 9/2010 | Toeroe | G06F 8/656 |
| | | | 709/221 |
| 2012/0233628 A1 | 9/2012 | Ling et al. | |
| 2012/0259960 A1 | 10/2012 | Sharma et al. | |
| 2014/0372513 A1* | 12/2014 | Jones | G06F 9/5072 |
| | | | 709/203 |
| 2015/0067316 A1 | 3/2015 | Zhang | |

* cited by examiner

COMPUTER SYSTEM MANAGEMENTS

BACKGROUND

Manageability ensures system robustness by facilitating reliability, availability, and serviceability of a computer system. Manageability is a key requirement for a broad spectrum of computer systems ranging from clients to servers to clusters of servers to large scale data centers. As used herein, manageability refers to the control over at least one management function of a computer system (e.g., a managed computer system including a managed computing device or a plurality of managed computing devices). Various management functions may be performed in the computer system. Examples of management functions include, but are not limited to, health monitoring, logging and alerting, configuration and control, analytics, anomaly detection, remote connect, scaling, deployment and updates, and asset discovery and inventory.

BRIEF DESCRIPTION OF THE DRAWINGS

The detailed description included herein references the following drawings.

DETAILED DESCRIPTION

Figure 1:
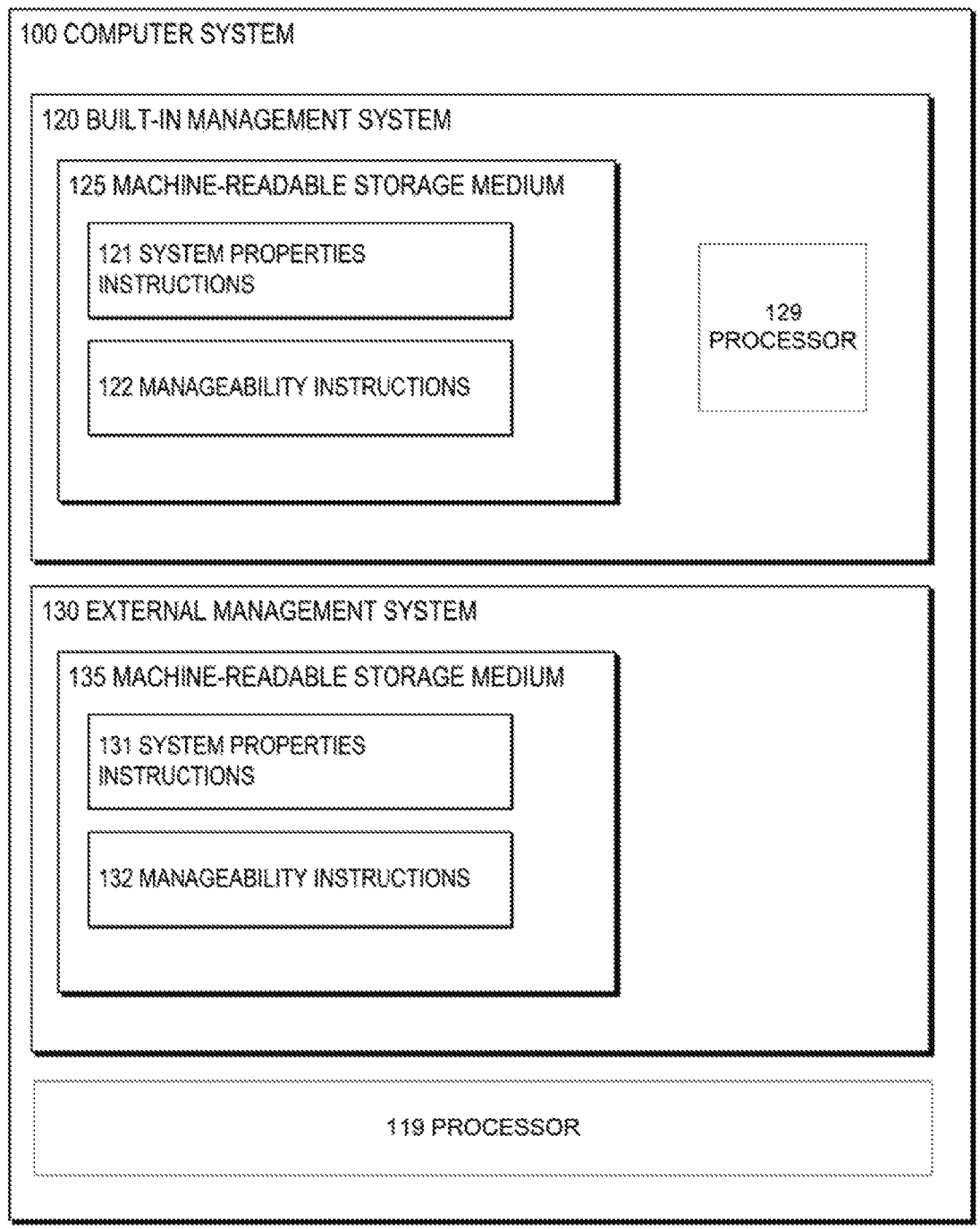
FIG. 1 is a block diagram depicting an example computer system in accordance with the present disclosure.

This detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A "computer system," as used herein, may refer to a single computing device or a plurality of computing devices. A computer system may be used in a way that was originally intended (e.g., intended use) and/or may be used in the same or a different way in deployment (e.g., deployed use). For example, a computer system may be configured in factory or before its sale or distribution to be used in a particular intended use. After the computer system is deployed, the intended use may change to a different use (e.g., deployed use) depending on different computing needs of the deployed environment. And even during the deployment, the deployed use of the computer system may change over time, or the computer system may even be re-deployed in another environment.

Examples of an intended and/or deployed use may include, but are not limited to, an intended and/or deployed use as: a server computing device, a client computing device, a cluster of server computing devices, an Internet of Things (IoT) sensor, a concentrator, a router, a switch, a system on a chip (SoC), and a storage array. Information indicating its use (e.g., intended or deployed) may be stored as part of configuration data (e.g., configuration files, firmware, etc.) associated with the computer system.

Manageability ensures system robustness by facilitating reliability, availability, and serviceability of a computer system. The computer system being managed may vary in its size and complexity, which may require a certain degree of manageability. As used herein, "manageability" refers to the control over at least one management function that can be enabled in a computer system. A degree of this control is referred to herein as "a degree of manageability." For example, the control over a higher number of management functions (e.g., enabling additional management functions) may indicate a higher degree of manageability. In another example, management functions may be classified into different levels and/or degrees of manageability. A higher degree of manageability may be achieved by enabling a set of management functions that are classified into the next level and/or degree of manageability.

Examples of management functions include, but are not limited to, health monitoring, logging and alerting, configuration and control, analytics, anomaly detection, remote connect, scaling, deployment and updates, and asset discovery and inventory.

The degree of manageability often remains static after deployment of the computer system unless it is manually adjusted by a human administrator. In many situations, even after the deployed use of the computer system changes over time, which may require additional management functions to be enabled, the computer system may fail to accommodate the changed manageability requirement. It may be technically challenging to automatically (e.g., without human intervention) and dynamically (e.g., as the requirements change) adjust the degree of manageability that meets the changed requirement.

Examples disclosed herein provide technical solutions to these technical challenges by dynamically adjusting the degree of manageability of a computer system based on properties of the computer system. Properties may include, but are not limited to: an intended use of the computer system, a deployed use of the computer system, a required degree of manageability of the computer system, and hardware specifications of the computer system. In some implementations, the computer system may be managed and/or controlled by a built-in management system that is built-in as a dedicated processor in the computer system. In some implementations, an external management system (e.g., that is external to the built-in management system) may manage and/or control the manageability of the computer system. The external management system represents a management software program. For example, the external management system may represent a software program running on the computer system, that is executed by a processor (e.g., that is not the dedicated processor of the built-in management system) of the computer system. In another example, the external management system may remotely, via network, manage and/or control the manageability of the computer system.

Some of the examples disclosed herein enable identifying properties of a computer system and adjusting a degree of manageability of the computer system based on the properties of the computer system.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It should also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example computer system 100. Although computer system 100 (also referred to herein as a host system) is depicted as a single computer or computing device, computer system 100 may also refer to a plurality of computing devices. A computing device, as used herein, may comprise be any type of computing device including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

In some implementations, computer system 100 may comprise a built-in management system 120. Built-in management system 120 may include processor executable instructions 121-122 stored on a machine-readable storage medium 125 and a processor 129 for executing those instructions. Processor 129 is a manageability processor (MP) that is dedicated to performing manageability tasks for management of computer system 100. A MP may comprise a baseboard management controller (BMC), an application-specific integrated circuit (ASIC) customized for specific manageability uses or operations, and/or a general-purpose processor (e.g., central processing unit (CPU) or any other multi-purpose processor or microprocessor). It should be noted that although the MP is implemented by a general-purpose processor, its specific purpose is to manage a host system in which it is implemented or embedded. The built-in manageability system 120 may include a dedicated memory, network interface cards or modules (NIC), and/or a private embedded OS that executes independently of the computer system. Such independence aids in removing resource interference for processors, buses, caches, and memory, thereby resulting in improved performance for host workloads that are CPU and memory bound.

The computer system includes at least one host processor, such as a processor 119, for executing host system software stored in a host memory. Examples of host system software include a host system OS, file system, drivers for host software and hardware components, and any other software applications installed in the host memory for executing within the host OS. As referred herein, the "host processor" (e.g., processor 119) is a general-purpose processor, such as a CPU or any other multi-purpose processor or microprocessor. The host processor also may be a special-purpose processor, such as a graphics processing unit (GPU), an audio processor, a digital signal processor, or another processor dedicated for one or more processing purposes other than manageability purposes.

In some implementations, computer system 100 may comprise an external management system 130 (e.g., that is external to built-in management system 120) that manages and/or controls the manageability of computer system 100. External management system 130 may include processor executable instructions 131-132 stored on a machine-readable storage medium 135. These instructions 131-132 may be executed by the host processor (e.g., processor 119). The host memory, as discussed above, may comprise machine-readable storage medium 135. Processor 119 may be at least one CPU, microprocessor, and/or other hardware device suitable for retrieval and execution of instructions stored in machine-readable storage medium 135. Processor 119 may fetch, decode, and execute program instructions 131-132, and/or other instructions. As an alternative or in addition to retrieving and executing instructions, processor 119 may include at least one electronic circuit comprising a number of electronic components for performing the functionality of at least one of instructions 131-132, and/or other instructions.

In some implementations, built-in management system 120 may manage a set of built-in management functions of computer system 100 while external management system 130 may be responsible for managing a set of external management functions. Examples of built-in management functions may include, but are not limited to, power consumption, the online or offline nature of core elements (e.g., computation/processor, memory, fabric/communication), and uptime guarantees (e.g., influenced by such factors as error handling, error containment, system redundancies, self-healing, etc.). Examples of external management functions may include, not be limited to, error data reporting, performance monitoring, etc.

Machine-readable storage medium 125 (or machine-readable storage medium 135) may be any electronic, magnetic, optical, or other physical storage device that contains or stores executable instructions. In some implementations, machine-readable storage medium 125 (or machine-readable storage medium 135) may be a non-transitory storage medium, where the term "non-transitory" does not encompass transitory propagating signals. Machine-readable storage medium 125 (or machine-readable storage medium 135) may be implemented in a single device or distributed across devices. Likewise, processor 129 (or processor 119) may represent any number of processors capable of executing instructions stored by machine-readable storage medium 125 (or machine-readable storage medium 135). Processor 129 (or processor 119) may be integrated in a single device or distributed across devices.

In one example, the program instructions may be part of an installation package that when installed can be executed by processor 129 (or processor 119). In this case, machine-readable storage medium 125 (or machine-readable storage medium 135) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 125 (or machine-readable storage medium 135) may include a hard disk, optical disk, tapes, solid state drives, random access memory (RAM), read-only memory (ROM), electrically-erasable programmable read-only memory (EEPROM), cache memory, or the like. In FIG. 1 and other Figures described herein, different numbers of components or entities than depicted may be used.

As discussed above, built-in management system 120 may comprise system properties instructions 121, manageability instructions 122, and/or other instructions stored on machine readable medium 125.

System properties instructions 121 may identify various properties of computer system 100. Various properties may include, for example, an intended use of computer system 100, a deployed use of computer system 100, a required degree of manageability of computer system 100, hardware specifications (e.g., processor specification, memory specification, etc.) of computer system 100, and/or other properties related to computer system 100.

Computer system 100 may be used in a way that was originally intended (e.g., intended use) and/or may be used in the same or a different way in deployment (e.g., deployed use). For example, computer system 100 may be configured in factory or before its sale or distribution to be used in a particular intended use. After computer system 100 is deployed, the intended use may change to a different use (e.g., deployed use) depending on different computing needs of the deployed environment. And even during the deployment, the deployed use of the computer system may change over time, or the computer system may even be re-deployed in another environment.

Examples of an intended and/or deployed use may include, but are not limited to, an intended and/or deployed use as: a server computing device, a client computing device, a cluster of server computing devices, an Internet of Things (IoT) sensor, a concentrator, a router, a switch, a system on a chip (SoC), and a storage array. Information indicating its use (e.g., intended or deployed) may be stored as part of configuration data (e.g., configuration files, firmware, etc.) associated with computer system 100.

A required degree of manageability may be determined based on manageability complexity (e.g., expressed in terms of the lines of code, amount of state, image size, etc.) of computer system 100. At any given time during deployment, a required degree of manageability may change for computer system 100. In one example, a required degree of manageability may be influenced by a change in its deployed use. Because the deployed use changes, which may require a different set of management functions, a degree of manageability that is required for computer system 100 may also change. In another example, a particular management function can be requested remotely, and computer system 100 may be responsible for fulfilling that request.

Hardware specifications may comprise, for example, processor specifications (e.g., the number of processors, vendor, model, etc.), memory specifications (e.g., types, size, vendor, model, etc.), etc. Information indicating hardware specifications may be stored as part of the configuration data associated with computer system 100.

Manageability instructions 122 may determine whether the properties (e.g., as identified by system properties instructions 121) are supported by a degree of manageability of computer system 100 (e.g., a degree of manageability that is currently configured for computer system 100). If any of the properties is not supported by the currently configured manageability, manageability instructions 122 may adjust the degree of manageability of computer system 100.

As used herein, "manageability" refers to the control over at least one management function that can be enabled in computer system 100. A degree of this control is referred to herein as "a degree of manageability." Examples of management functions include, but are not limited to, health monitoring, logging and alerting, configuration and control, analytics, anomaly detection, remote connect, scaling, deployment and updates, and asset discovery and inventory.

In some implementations, management functions may be classified into different levels and/or degrees of manageability. A higher degree of manageability may be achieved by enabling a set of management functions that are classified into the next level and/or degree of manageability. In this example, manageability instructions 122 may store a mapping between each of the properties (e.g., intended use, deployed use, required degree of manageability, hardware specification) and a particular degree of manageability (and/or a corresponding set of management functions required for that degree of manageability) that would support each property.

With respect to the deployed use, there may be a mapping between a first deployed use (e.g., IoT sensor) and a first set of management functions (e.g., health monitoring, configuration and control) that are required to support the first deployed use. There may be another mapping between a second deployed use (e.g., a concentrator) and a second set of management functions (e.g., scaling) that are required to support the second deployed use. If manageability instructions 122 determines that the first deployed use of computer system 100 has been changed to the second deployed use, manageability instructions 122 may adjust the degree of manageability of computer system 100 by enabling the second set of management functions. There may be another mapping between a third deployed use (e.g., a server) and a third set of management functions (e.g., analytics, anomaly detection) that are required to support the third deployed use. If manageability instructions 122 determines that the first deployed use of computer system 100 has been changed to the third deployed use, manageability instructions 122 may adjust the degree of manageability of computer system 100 by enabling the second and third sets of management functions. Thus, the degree of manageability may be incrementally adjusted based on each change. Similarly, if the third deployed use is downgraded to the first deployed use, for example, manageability instructions 122 may adjust the degree of manageability of computer system 100 by disabling the second and third sets of management functions, leaving the first set of management functions remain enabled.

Further, other properties such as the intended use, required degree of manageability, and hardware specifications may be also similarly mapped to different levels and/or degrees of manageability (and/or their corresponding sets of management functions). For example, the mappings may include a mapping between a first hardware specification (e.g., 1 core processor, 1 GB memory) and the first set of management functions, another mapping between a second hardware specification (e.g., 4 core processors, 2 GB memory) and the second set of management functions, and so on. If any of these properties of computer system 100 change, manageability instructions 122 may dynamically adjust the degree of manageability according to the mappings.

Adjusting the degree of manageability may be accomplished in various ways. In some implementations, computer system 100 may be pre-configured with an entire or maximum set of management functions, and manageability instructions 122 may dynamically enable and/or disable a particular management function (e.g., a subset of the built-in or external management functions) based on any of the properties (and/or changes thereof). Some management function may be adjusted to run in a different way (e.g., more frequently monitoring). In some implementations, computer system 100 may be pre-configured with a minimal set of management functions. Any additional management functions required based on the properties (and/or changes thereof) may be added (e.g., as a plug-in module) to expand the minimal set. Any of the added functions may be removed to strip the manageability to the minimal set. In some implementations, the degree of manageability may e configured and/or adjusted by offloading it to a remote server.

In some implementations, the degree of manageability may be adjusted by balancing the manageability along a continuum of maximum built-in management with minimum external management, and/or the opposite of the aforementioned scenario. For example, the degree of manageability may be adjusted by enabling a maximum number of the set of built-in management functions and a minimum number of the set of external management functions, or enabling a minimum number of the set of built-in management functions and a maximum number of the set of external management functions.

As discussed above, external management system 130 may comprise system properties instructions 131, manageability instructions 132, and/or other instructions stored on machine readable medium 135.

System properties instructions 131 may include similar functionalities as discussed herein with respect to system properties instructions 121.

Manageability instructions 132 may include similar functionalities as discussed herein with respect to manageability instructions 122.

Figure 2:
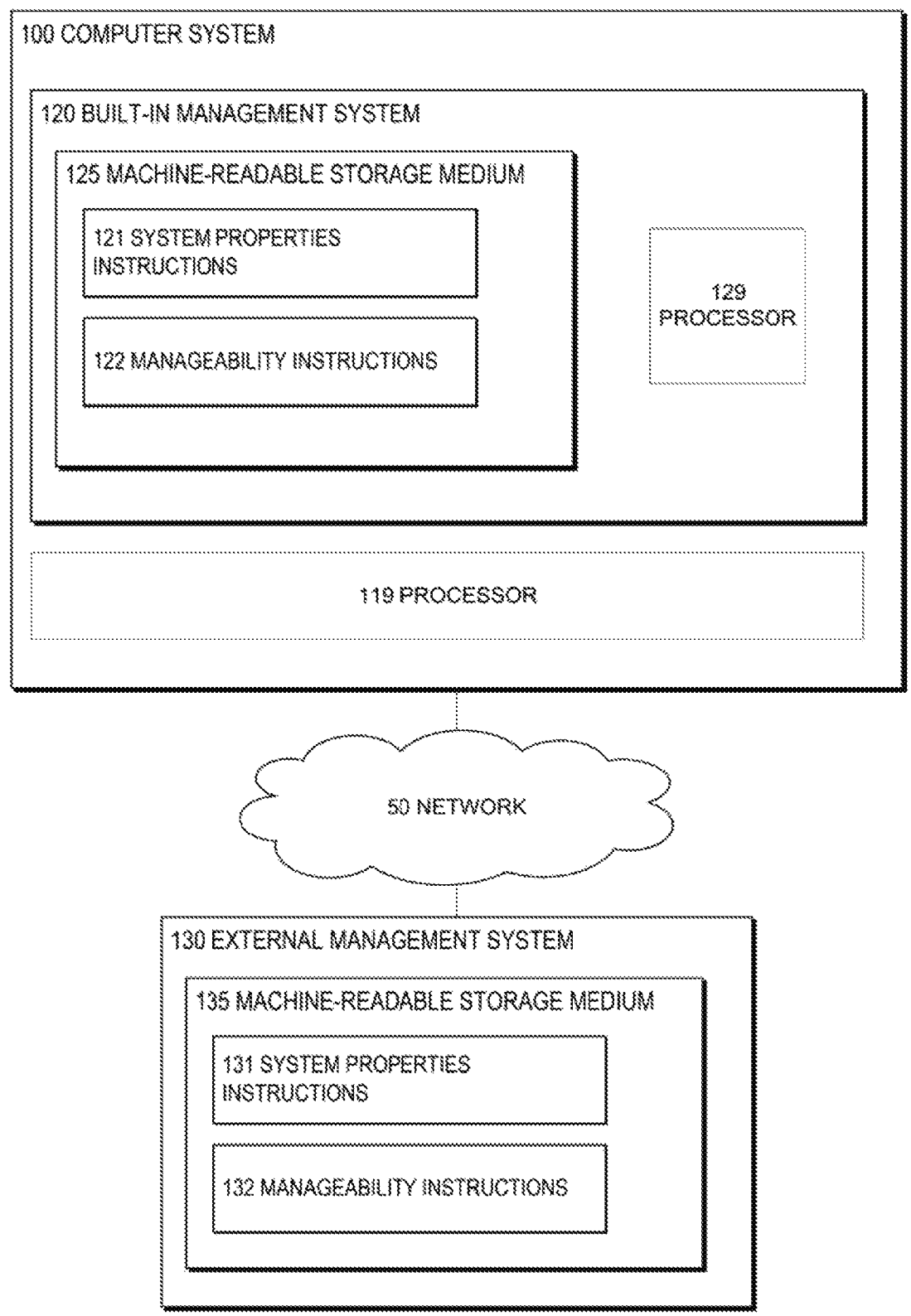
FIG. 2 is a block diagram depicting an example computer system in communication with an external management system via network in accordance with the present disclosure.

FIG. 2 is a block diagram depicting an example computer system 100 in communication with an external management system 130 via network 50. Computer system 100, built-in management system 120, machine-readable storage medium 125, system properties instructions 121, manageability instructions 122, processor 129, and processor 119 of FIG. 2 represent those same components depicted in FIG. 1. In the example depicted in FIG. 2, external management system 130 comprising system properties instructions 131 and manageability instructions 132 stored on machine-readable storage medium 135 may remotely, via network 50, manage and/or control manageability of computer system 100. Instructions 131-132 may be executed by a processor of computer system 100 (e.g., processor 119 or processor 129). Note that instructions 131-132 of FIG. 2 represent instructions 131-132 of FIG. 1, respectively. In some implementations, external management system 130 may manage and/or control the manageability of a plurality of computer systems via network 50.

Network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 3:
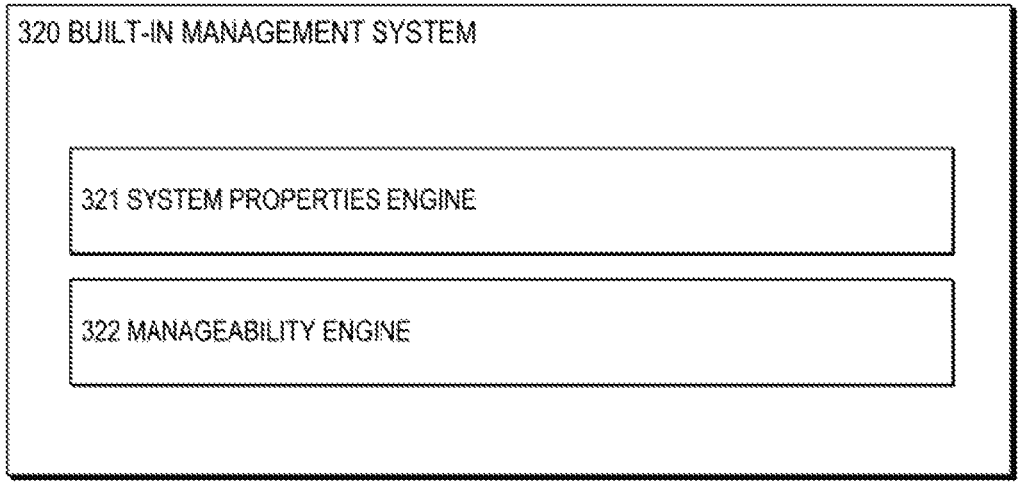
FIG. 3 is a block diagram depicting an example built-in management system in accordance with the present disclosure.

FIG. 3 is a block diagram depicting an example built-in management system 320. Built-in management system 320 may comprise a system properties engine 321, a manageability engine 322, and/or other engines. The term "engine", as used herein, refers to a combination of hardware and programming that performs a designated function. As is illustrated respect to FIGS. 1-2, the hardware of each engine, for example, may include one or both of a processor and a machine-readable storage medium, while the programming is instructions or code stored on the machine-readable storage medium and executable by the processor to perform the designated function. For example instructions 121-122 represent program instructions that, when executed, cause processor 129 to implement engines 321-322, respectively.

Figure 4:
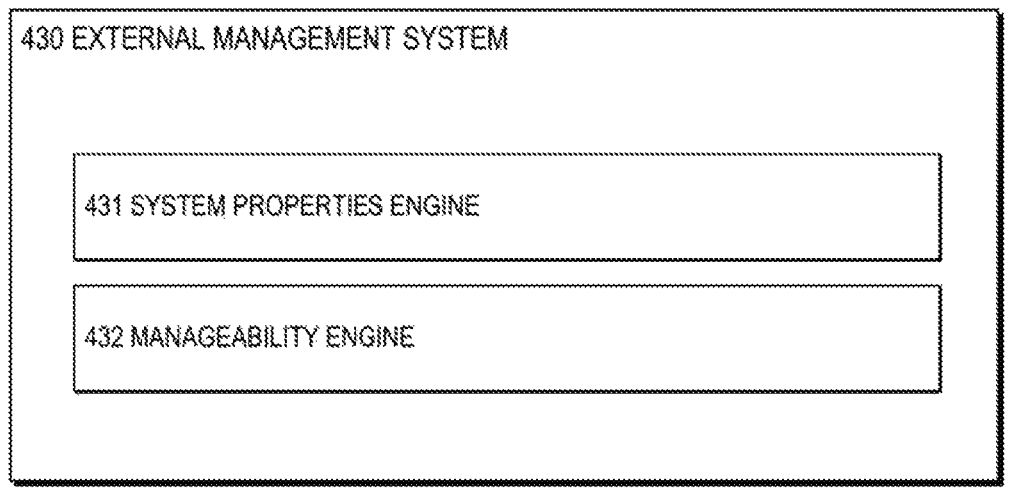
FIG. 4 is a block diagram depicting an example external management system in accordance with the present disclosure.

FIG. 4 is a block diagram depicting an example external management system 430. External management system 430 may comprise a system properties engine 431, a manageability engine 432, and/or other engines. For example instructions 131-132 represent program instructions that, when executed, cause processor 119 to implement engines 431-432, respectively.

Figure 5:
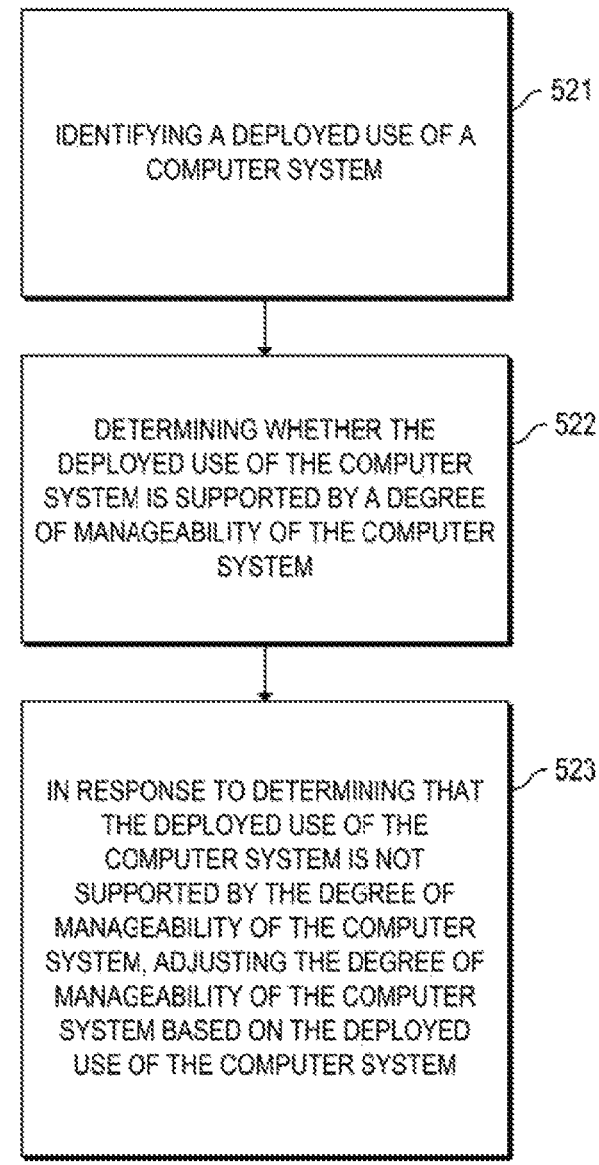
FIG. 5 is a flow diagram depicting an example method for managing computer systems in accordance with the present disclosure.

FIG. 5 is a flow diagram depicting an example method 500 for managing computer systems. The various processing blocks and/or data flows depicted in FIG. 5 (and in the other drawing figures such as FIGS. 6-7) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 125 and/or 135, and/or in the form of electronic circuitry.

In block 521 method 500 may include identifying a deployed use of a computer system. Referring back to FIG. 3, system properties engine 321 may be responsible for implementing block 521. Referring back to FIG. 4, system properties engine 431 may be responsible for implementing block 521.

In block 522, method 500 may include determining whether the deployed use of the computer system is supported by a degree of manageability of the computer system. Referring back to FIG. 3, manageability engine 322 may be responsible for implementing block 522. Referring back to FIG. 4, manageability engine 432 may be responsible for implementing block 522.

In block 523, method 500 may include, in response to determining that the deployed use of the computer system is not supported by the degree of manageability of the computer system, adjusting the degree of manageability of the computer system based on the deployed use of the computer system. Referring back to FIG. 3, manageability engine 322 may be responsible for implementing block 523. Referring back to FIG. 4, manageability engine 432 may be responsible for implementing block 523.

Figure 6:
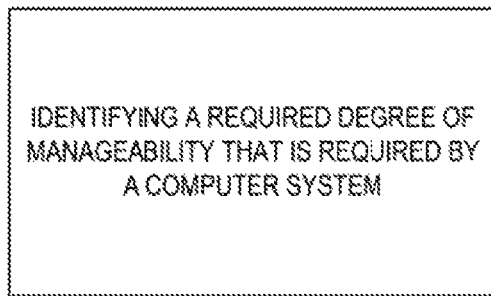
FIG. 6 is a flow diagram depicting an example method for managing computer systems in accordance with the present disclosure.
Figure 6:
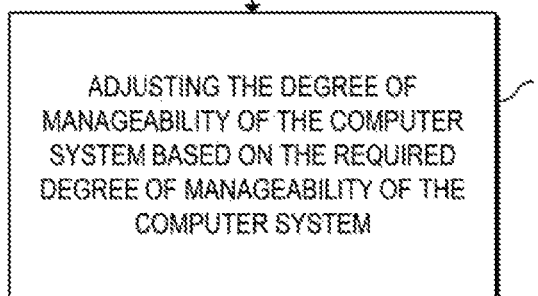

FIG. 6 is a flow diagram depicting an example method 600 for managing computer systems. Method 600 as illustrated (and described in greater detail below) is meant to be an example and, as such, should not be viewed as limiting. Method 600 may be implemented in the form of executable instructions stored on a machine-readable storage medium, such as storage medium 125 and/or 135, and/or in the form of electronic circuitry.

In block 621, method 600 may include identifying a required degree of manageability that is required by a computer system. Referring back to FIG. 3, system properties engine 321 may be responsible for implementing block 621. Referring back to FIG. 4, system properties engine 431 may be responsible for implementing block 621.

In block 622, method 600 may include adjusting the degree of manageability of the computer system based on the required degree of manageability of the computer system. Referring back to FIG. 3, manageability engine 322 may be responsible for implementing block 622. Referring back to FIG. 4, manageability engine 432 may be responsible for implementing block 622.

Figure 7:
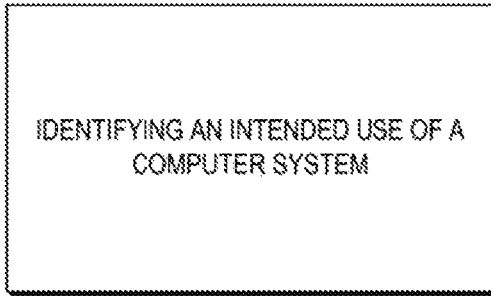
FIG. 7 is a flow diagram depicting an example method for managing computer systems in accordance with the present disclosure.
Figure 7:
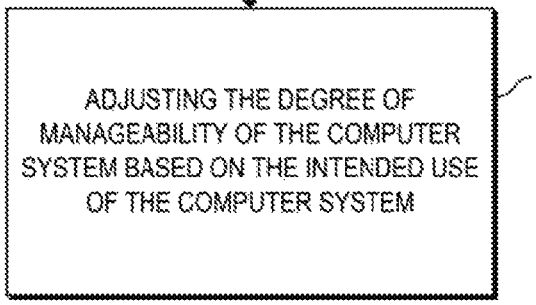

FIG. 7 is a flow diagram depicting an example method 700 for managing computer systems. Method 700 as illustrated (and described in greater detail below) is meant to be an example and, as such, should not be viewed as limiting. Method 700 may be implemented in the form of executable instructions stored on a machine-readable storage medium, such as storage medium 125 and/or 135, and/or in the form of electronic circuitry.

In block 721, method 700 may include identifying an intended use of a computer system. Referring back to FIG. 3, system properties engine 321 may be responsible for implementing block 721. Referring back to FIG. 4, system properties engine 431 may be responsible for implementing block 721.

In block 722, method 700 may include adjusting the degree of manageability of the computer system based on the intended use of the computer system. Referring back to FIG. 3, manageability engine 322 may be responsible for implementing block 722. Referring back to FIG. 4, manageability engine 432 may be responsible for implementing block 722.

The foregoing disclosure describes a number of example implementations for managing computer systems. The disclosed examples may include systems, devices, computer-readable storage media, and methods for managing computer systems. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
identifying a first deployed use of a first computer system, wherein the first computer system has a set of at least one enabled management function;
determining whether the first deployed use of the first computer system is supported by a degree of manageability of the first computer system;
in response to determining that the first deployed use of the first computer system is not supported by the degree of manageability of the first computer system, adjusting the degree of manageability of the first computer system based on the first deployed use of the first computer system, wherein adjusting the degree of management comprises at least one of enabling an additional management function of the first computer system or increasing a level of control over an enabled management function of the set of at least one enabled management function;
storing a second mapping between a second deployed use and a second degree of manageability that supports the second deployed use;
determining whether the first deployed use of the first computer system has been changed; and
in response to determining that the first deployed use of the first computer system has been changed to the second deployed use, adjusting the degree of manageability of the first computer system from the first degree of manageability to the second degree of manageability.

2. The method of claim 1, wherein the first deployed use comprises at least one of: a deployed use as a server computing device, a deployed use as a client computing device, a deployed use as a cluster of server computing devices, a deployed use as an Internet of Things (IoT) sensor, and a deployed use as a concentrator.

3. The method of claim 1, further comprising:
identifying a required degree of manageability that is required by the first computer system; and
adjusting the degree of manageability of the first computer system based on the required degree of manageability of the first computer system.

4. The method of claim 1, comprising:
identifying an intended use of a first computer system; and
adjusting the degree of manageability of the first computer system based on the intended use of the first computer system.

5. The method of claim 1, comprising:
identifying a deployed use of a second computer system;
determining whether the deployed use of the second computer system is supported by a degree of manageability of the second computer system; and
in response to determining that the deployed use of the second computer system is not supported by the degree of manageability of the second computer system, adjusting the degree of manageability of the second computer system based on the deployed use of the second computer system.

6. The method of claim 1, wherein the set of at least on management function comprises at least one of a health monitoring function, a logging and alerting function, a configuration and control function, an analytics function, an anomaly detection function, a remote connect function, a scaling function, a deployment and update function, or an asset discovery and inventory function.

7. A non-transitory machine-readable storage medium comprising instructions, that when executed by a processor, cause the processor to:
 identify properties of a computer system that manages a set of built-in management functions of the computer system;
 adjust a degree of manageability of the computer system based on the properties of the computer system by at least one of: enabling a first subset of the set of built-in management functions, disabling a second subset of the set of built-in management functions, or adding a new management function to the set of built-in management functions; and
 manage a set of external management functions of the computer system, wherein the external management system causes a second processor of the computer system to adjust the degree of manageability of the computer system by enabling a maximum number of the set of built-in management functions and a minimum number of the set of external management functions, or enabling a minimum number of the set of built-in management functions and a maximum number of the set of external management functions, and wherein the set of external management functions comprise at least one of an error data reporting function or a performance monitoring function.

8. The non-transitory machine-readable storage medium of claim 7, wherein the computer system comprises a built-in management system that manages the set of built-in management functions.

9. The non-transitory machine-readable storage medium of claim 7, wherein the instructions, when executed by the processor, further cause the processor to:
 adjust the degree of manageability of the computer system based on the properties of the computer system by allowing an external management system that is external to a built-in management system to manage a set of external management functions of the computer system.

10. The non-transitory machine-readable storage medium of claim 7, wherein the properties comprise at least one of: a deployed use of the computer system, an intended use of the computer system, and a required degree of manageability of the computer system.

11. The non-transitory machine-readable storage medium of claim 7, wherein the instructions, when executed by the processor, further cause the processor to:
 determine whether the properties of the computer system are supported by the degree of manageability of the computer system; and
 in response to determining that the properties of the computer system are not supported by the degree of manageability of the computer system, adjust the degree of manageability of the computer system based on the properties of the computer system.

12. The non-transitory machine-readable storage medium of claim 7, wherein adding the new management function to the set of built-in management functions comprises:
 adding a plug-in module to the set of built-in management functions.

13. The non-transitory machine-readable storage medium of claim 7, wherein the set of built-in management functions comprise at least one of a power consumption function, a function to manage an online or offline nature of a core element of the computer system, or a function to manage an uptime guarantee.

14. The non-transitory machine-readable storage medium of claim 13, wherein:
 the core element comprises a processor, a memory or communication fabric component; and
 the function to manage the uptime guarantee comprises an error handling function, an error containment function, a system redundancies function, or a self-healing function.

15. A system comprising:
 a built-in management system that manages a set of built-in management functions of a computer system, the built-in management system comprising a first processor of the computer system, wherein the first processor:
  identifies a deployed use of the computer system; and
  adjusts a degree of manageability of the computer system based on the deployed use of the computer system by at least one of: enabling a first subset of the set of built-in management functions, disabling a second subset of the set of built-in management functions, or adding a new management function to the set of built-in management functions; and
 an external management system that manages a set of external management functions of the computer system, wherein the external management system causes a second processor of the computer system to adjust the degree of manageability of the computer system by enabling a maximum number of the set of built-in management functions and a minimum number of the set of external management functions, or enabling a minimum number of the set of built-in management functions and a maximum number of the set of external management functions, and wherein the set of external management functions comprise at least one of an error data reporting function or a performance monitoring function.

16. The system of claim 15, wherein the first processor comprises a baseboard management controller (BMC) of the computer system.

17. The system of claim 15, wherein the set of built-in management functions comprise at least one of a power consumption function, a function to manage an online or offline nature of a core element of the computer system, or a function to manage an uptime guarantee.

\* \* \* \* \*